US006811230B2

(12) United States Patent
Imamura

(10) Patent No.: US 6,811,230 B2
(45) Date of Patent: Nov. 2, 2004

(54) MODULE HOUSING BRACKET AND ELECTRONIC APPARATUS

(75) Inventor: Akira Imamura, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 45 days.

(21) Appl. No.: 10/233,544

(22) Filed: Sep. 4, 2002

(65) Prior Publication Data

US 2003/0052248 A1 Mar. 20, 2003

(30) Foreign Application Priority Data

Sep. 19, 2001 (JP) ........................................ 2001-285779

(51) Int. Cl.[7] ............................................. H05K 7/18
(52) U.S. Cl. .................................................. 312/223.2
(58) Field of Search ............................. 248/231, 231.9; 361/684, 685, 724, 725, 727; 312/223.1, 223.2

(56) References Cited

U.S. PATENT DOCUMENTS

| | | | | |
|---|---|---|---|---|
| 6,227,632 B1 | * | 5/2001 | Liu ........................... | 312/223.2 |
| 6,293,636 B1 | * | 9/2001 | Le et al. .................. | 312/223.2 |
| 6,317,318 B1 | * | 11/2001 | Kim .......................... | 361/685 |
| 6,351,376 B1 | * | 2/2002 | Liang et al. ............... | 361/685 |
| 6,377,449 B1 | * | 4/2002 | Liao et al. ................. | 361/685 |
| 6,606,242 B2 | * | 8/2003 | Goodman et al. .......... | 361/685 |
| 6,644,762 B1 | * | 11/2003 | Chen ....................... | 312/223.2 |

FOREIGN PATENT DOCUMENTS

| | | |
|---|---|---|
| JP | 3-130093 | 12/1991 |
| JP | 6-002431 | 1/1994 |
| JP | 6-309859 | 11/1994 |
| TW | 2000-390447 | 5/2000 |
| TW | 2001-423790 | 2/2001 |

* cited by examiner

Primary Examiner—Janet M. Wilkens
(74) Attorney, Agent, or Firm—Finnegan, Henderson, Farabow, Garrett & Dunner, L.L.P.

(57) ABSTRACT

A bracket is removably attached to a side panel of an enclosure of an electronic apparatus. A module, that is capable of loading into and unloading from the bracket, is provided with a protuberance and a tapped hole. The bracket has an engaging portion, adapted to engage the protuberance of the loaded module, and an aperture located in a position opposite the tapped hole of the loaded module. The module is held in a predetermined position in the bracket in a state that the protuberance engages the engaging portion and a fixing screw is driven into the tapped hole through the aperture.

7 Claims, 8 Drawing Sheets

MODULE HOUSING BRACKET AND ELECTRONIC APPARATUS

CROSS-REFERENCE TO RELATED APPLICATIONS

This application is based upon and claims the benefit of priority from the prior Japanese Patent Application No. 2001-285779, filed Sep. 19, 2001, the entire contents of which are incorporated herein by reference.

BACKGROUND OF THE INVENTION

1. Field of the Invention

The present invention relates to a bracket for housing a module such as a hard disc drive and an electronic apparatus provided with the same.

2. Description of the Related Art

A desktop computer as an electronic apparatus comprises an enclosure in the form of a rectangular box. The enclosure is stored with various electronic components, such as modules, including a CD drive (hereinafter referred to as HDD), magnetic disc drive, etc.

An HDD described in Jpn. Pat. Appln. KOKAI Publication No. 6-309859, for example, is fixed to a dedicated bracket in the form of a rectangular frame by means of screws, and this bracket is fixed in the enclosure of a computer.

In mounting, replacing, or adding HDDs in computers constructed in this manner, the dedicated bracket must be temporarily removed from the enclosure, and moreover, each HDD must be removed from or attached to the bracket. Therefore, the efficiency of assembly, replacement, and recycling are low, making it troublesome for a user.

BRIEF SUMMARY OF THE INVENTION

The present invention has been contrived in consideration of these circumstances, and its object is to provide a module housing bracket that facilitates attachment and detachment of a module, and an electronic apparatus provided with the same.

In order to achieve the above object, a bracket according to an aspect of the invention is provided for housing a module having a protuberance and a tapped hole. The bracket comprises an engaging portion configured to engage the protuberance to hold the module in a predetermined position in the bracket; and an aperture located in a position opposite the tapped hole of the module which is held in the predetermined position, such that a screw is driven into the tapped hole through the aperture.

An electronic apparatus according to another aspect of the invention comprises an enclosure having a plurality of wall portions, a bracket having a loading slot and removably mounted in the enclosure, and a module capable of being loaded into and unloaded from the bracket through the loading slot. The module includes a protuberance and a tapped hole, the bracket includes an engaging portion configured to engage the protuberance to hold the module in a predetermined position in the bracket and an aperture screwing located in a position opposite the tapped hole of the module which is held in the predetermined position in the bracket, such that a screw is driven into the tapped hole through the aperture.

According to the bracket and the electronic apparatus constructed in this manner, the module is housed in the bracket in a manner such that one side of the module is held by means of the protuberance and only the other side is screwed. Thus, the module can be easily attached and detached without removing the bracket.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate a presently embodiment of the invention, and together with the general description given above and the detailed description of the embodiment given below, serve to explain the principles of the invention.

DETAILED DESCRIPTION OF THE INVENTION

A desktop computer according to an embodiment of the present invention will now be described in detail with reference to the accompanying drawings.

Figure 1:
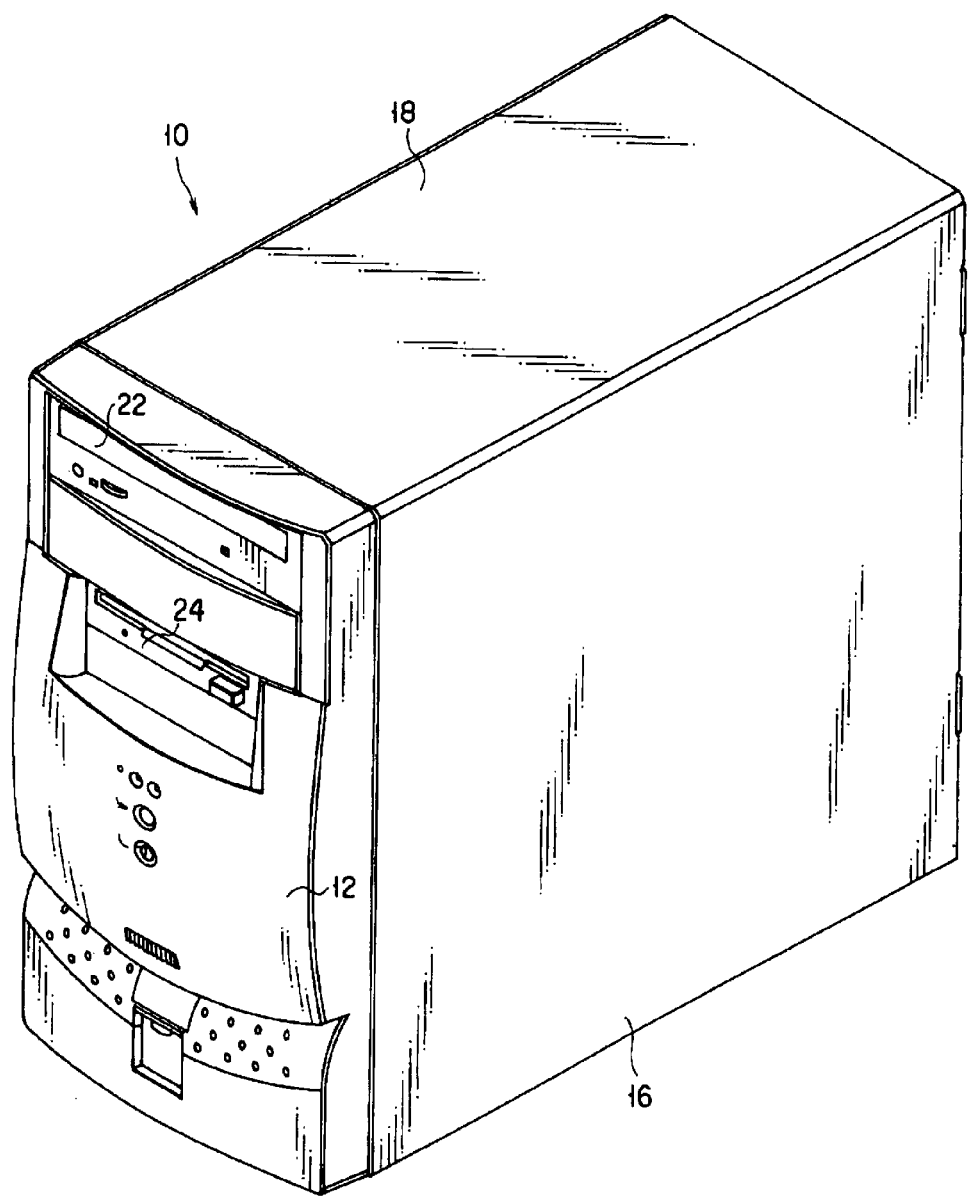
FIG. 1 is a perspective view showing a desktop computer according to an embodiment of the invention.
Figure 2:
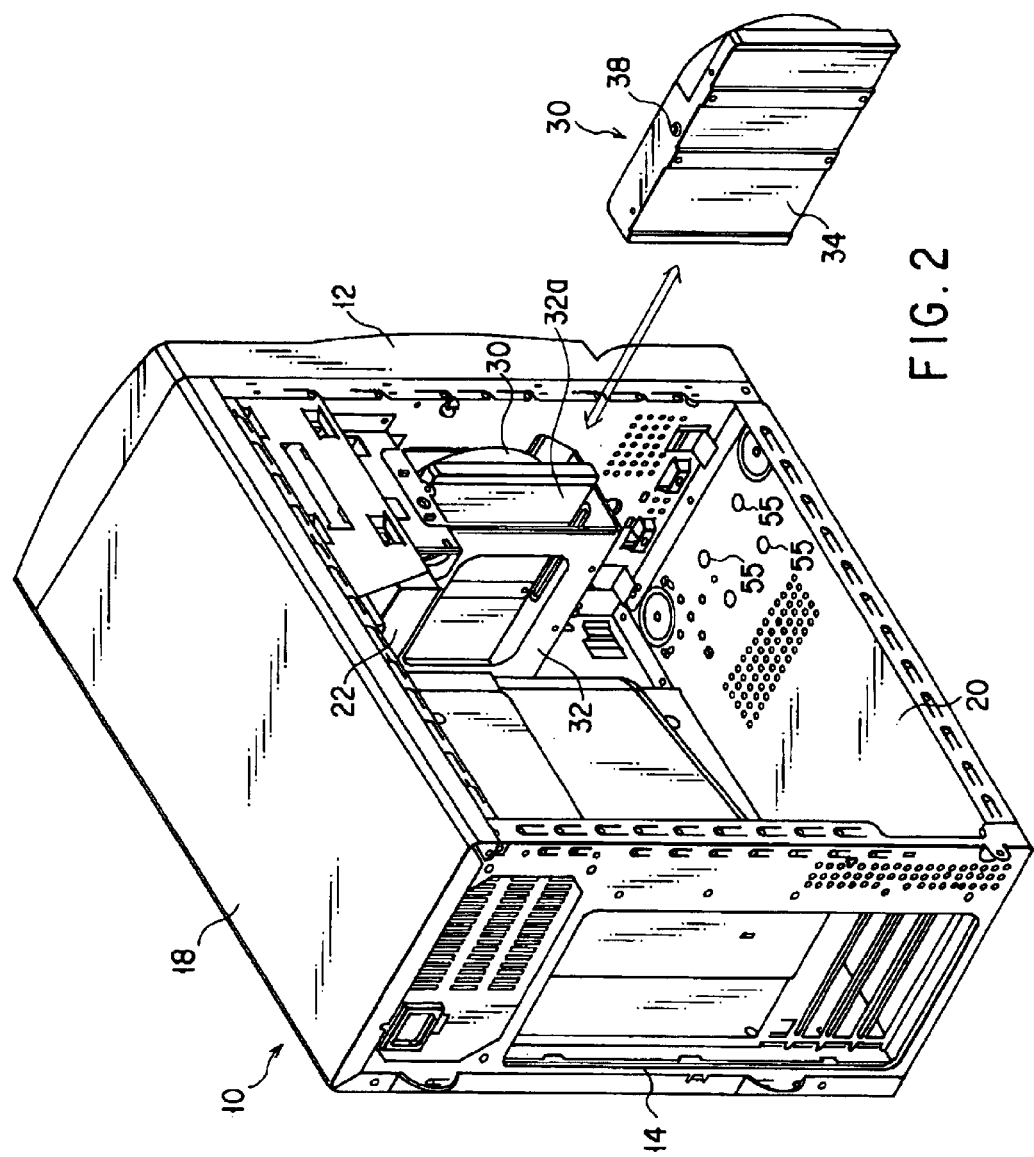
FIG. 2 is a perspective view showing the interior of the computer body with its side panel off.
Figure 3:
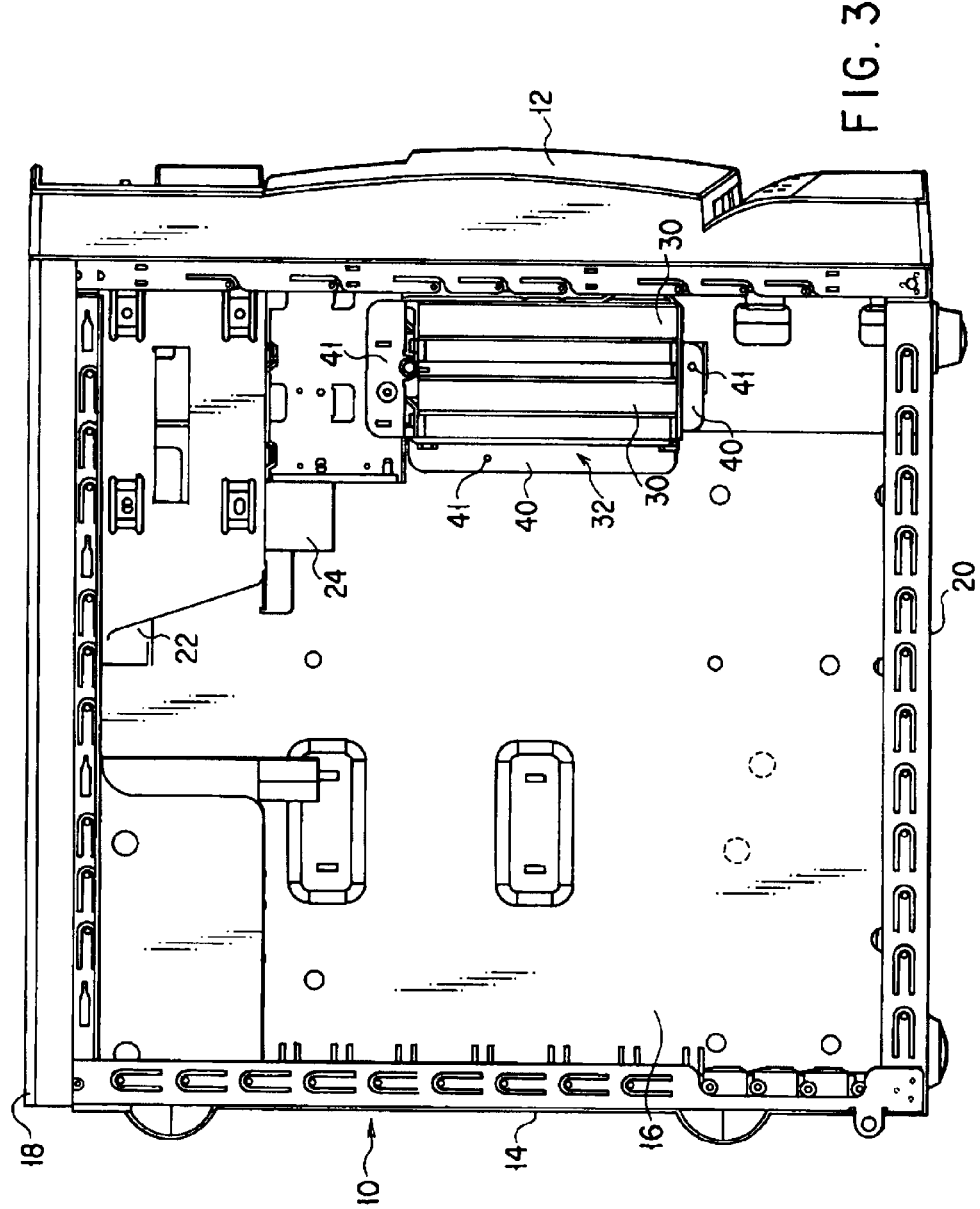
FIG. 3 is a side view showing the interior of the computer body with its side panel off.
Figure 4:
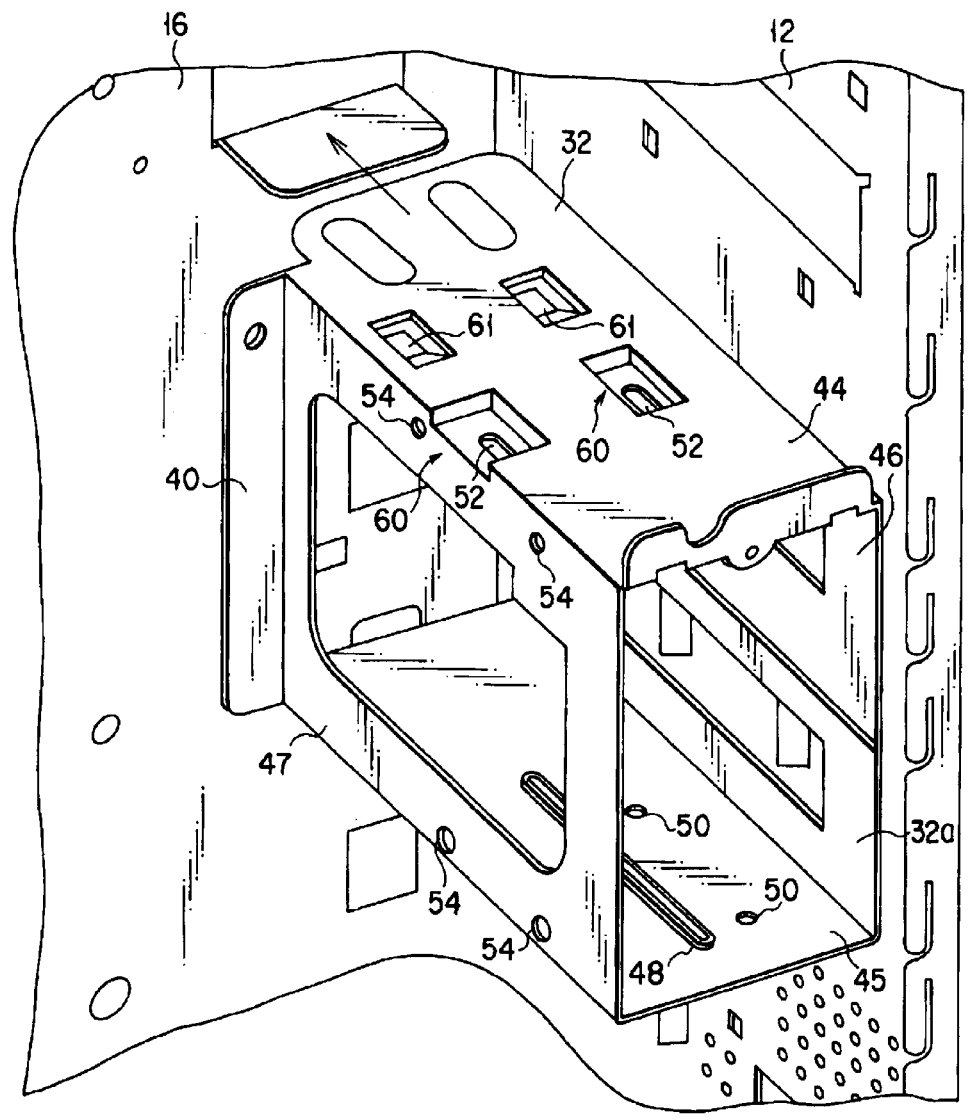
FIG. 4 is an exploded perspective view showing the interior of the body and a bracket of an HDD loading portion.
Figure 5:
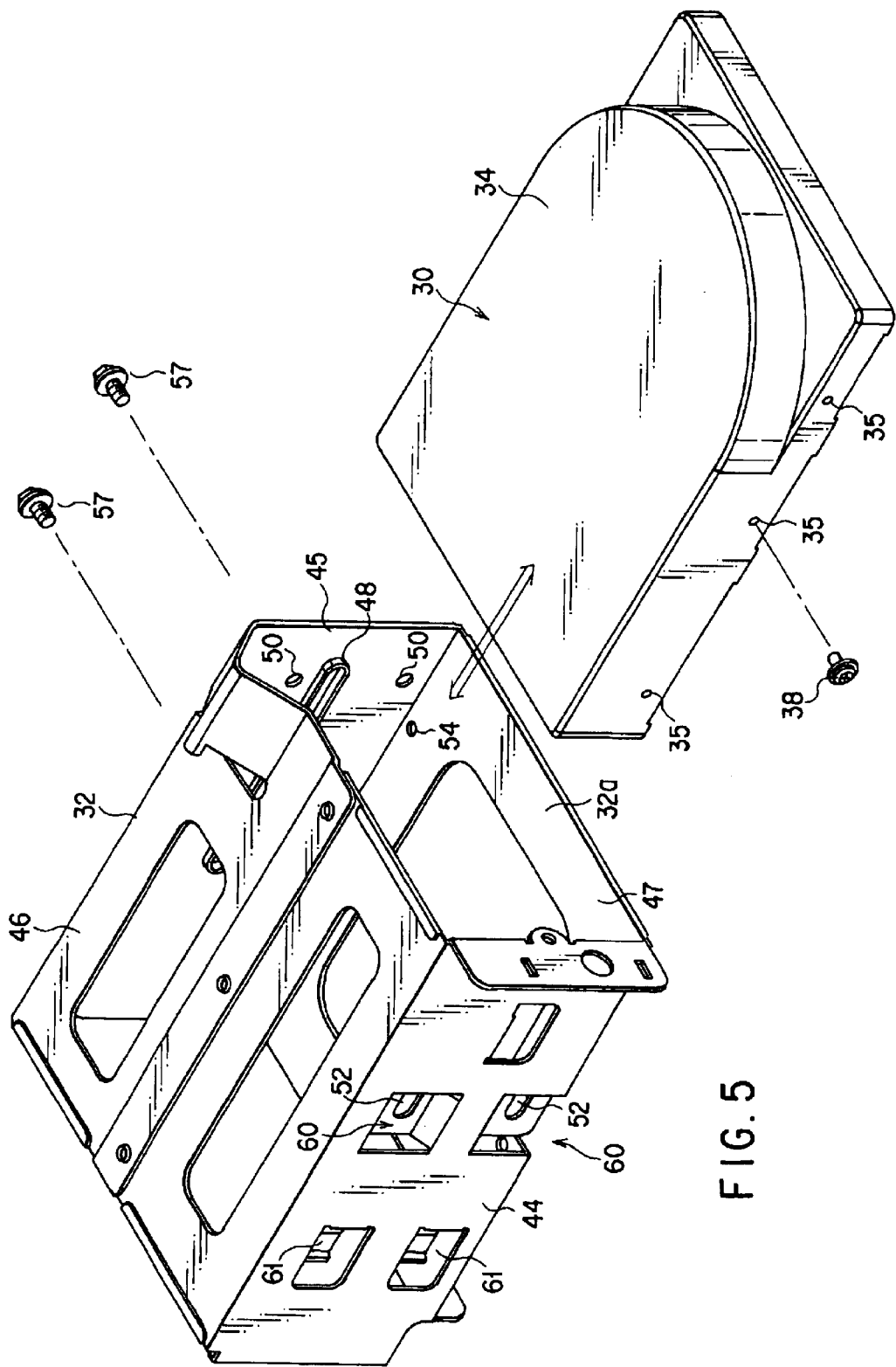
FIG. 5 is an exploded perspective view showing the bracket and an HDD.

As shown in FIGS. 1 to 3, the computer comprises an enclosure 10 in the form of a rectangular box that has a plurality of wall portions. The wall portions of the enclosure 10 include front and rear panels 12 and 14 that extend substantially vertically, a pair of side panels 16 that are opposed to each other in parallel relation, and top and bottom panels 18 and 20 that extend horizontally.

A CD drive 22 and a magnetic disc drive 24 are located in the enclosure 10, and their respective front panels are exposed through the upper half of the front panel 12 of the enclosure 10.

The enclosure 10 contains an HDD loading portion that is loaded with a HDD 30 for use as a module. As shown in FIGS. 2 to 6, the HDD loading portion is provided with a bracket 32 that is removably attached to the inner surface of the enclosure 10, e.g., the inner surface of the one side panel 16.

The HDD 30 will be described first. The HDD has a flat rectangular case 34, and three tapped holes 35 are formed in each long sidewall of the case that serve as first and second walls. The three tapped holes 35 are spaced from one another in the longitudinal direction of the case 34. Further, four tapped holes 36 are formed in the bottom wall of the case 34 that serves as a third wall. The four tapped holes 36 are spaced from one another.

A collared screw 38 having a collar is screwed into the central one of the tapped holes 35 in the one sidewall. As this is done, the collar of the screw 38 is opposed to the side face of the case 34 across a certain gap. The collared screw 38 constitutes a protuberance that projects from the side face of the case 34.

The bracket 32 is a square tube that is formed of a metallic plate, for example, and has a size such that it can store two HDDs 30 in a substantially upright state. The bracket 32 has a flange 40 on its one end portion in the axial direction. The bracket 32 is removably attached to the side panel 16 of the enclosure 10 in a manner such that the flange 40 is held against the side panel 16 and fixed to it by means of, for example, three fixing screws 41 that are passed through apertures in the flange 40.

Further, the bracket 32, attached to the enclosure 10, has a top wall 44 opposed to the top panel 18 of the enclosure in substantially parallel relation, a bottom wall 45 opposed to the bottom panel 20 of the enclosure in substantially parallel relation, a front wall 46 adjacently opposed to the front panel 12 of the enclosure, and a rear wall 47 opposed to the front wall across a certain gap in substantially parallel relation. Each HDD 30 can be loaded into or unloaded from the bracket 32 through the other end opening of the bracket 32 or a loading slot 32a. Each HDD 30 can be loaded into the bracket 32 with its opposite side faces in a substantially upright state such that they face the top wall 44 and the bottom wall 45 of the bracket, individually.

An elongate guide ridge 48 is formed on the center of the inner surface of the bottom wall 45 of the bracket 32 and extends in the longitudinal direction of the bracket. The guide ridge 48 serves to guide each HDD 30 as it is loaded into the bracket 32, and to regulate the position of each HDD set in the bracket. The bottom wall 45 is formed having two apertures for each HDD, which are spaced in the longitudinal direction of the bracket 32. The apertures 50 are formed in positions such that they are aligned individually with the two tapped holes 35 in the side face of each HDD 30, especially the two tapped holes 35 in that side face which are not provided with the collared screw 38.

Four apertures 54 are formed in the rear wall 47 of the bracket 32. These apertures 54 are formed in positions such that they are aligned individually with the four tapped holes 36 in the bottom surface of the case of each HDD 30 when the HDD is set in a predetermined position in the bracket 32.

As shown in FIGS. 4 to 7, two raised portions corresponding to the HDDs are formed on the top wall 44 of the bracket 32 by partially raising the top wall toward the inside of the bracket. The raised portions are spaced in the longitudinal direction of the bracket 32. Those raised portions which are situated on the side of the loading slot 32a of the bracket 32 have their respective slits 52, which extend in the longitudinal direction of the bracket and open toward the loading slot 32a of the bracket. Each raised portion, thus having the slit 52, constitutes an engaging portion 60 that engages the collared screw 38 of each corresponding HDD 30, as mentioned later. Each of the other raised portions constitutes a positioning portion 61 that elastically engages the side face of its corresponding loaded HDD 30, thereby positioning the HDD.

Figure 8:
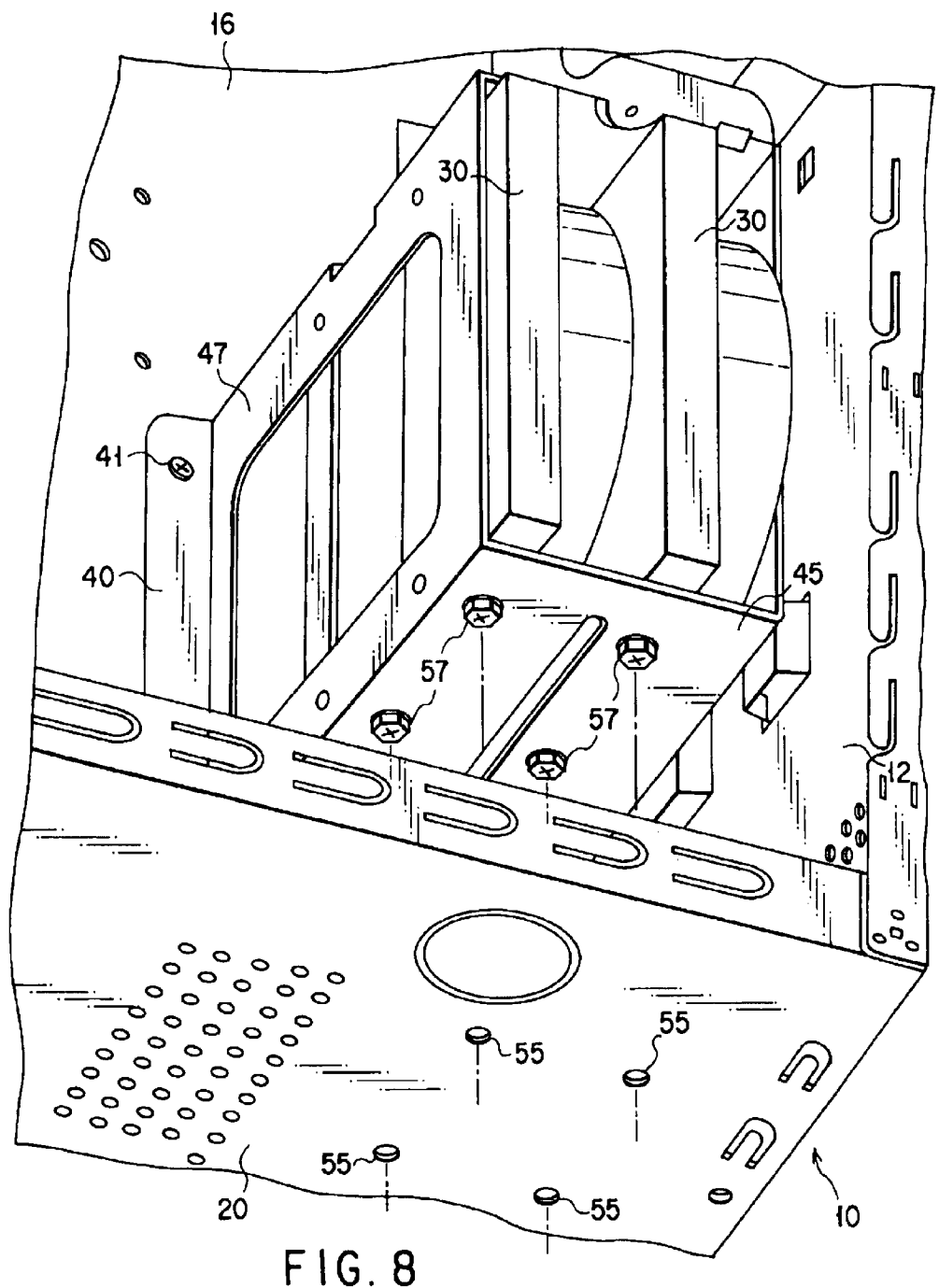
FIG. 8 is a perspective view showing the bracket, the HDD, and the bottom-panel side of the body.

As shown in FIGS. 2 and 8, the bottom panel 20 of the enclosure 10 is formed having four through holes 55 through which a screwdriver can be passed. These through holes 55 are aligned individually with the four apertures 50 in the bottom wall 45 of the bracket 32. Thus, the apertures 50 of the bracket 32 can be externally accessed in a manner such that the screwdriver is passed through the through holes 55 of the bracket 32 from outside the enclosure 10.

In loading each HDD 30 into the enclosure 10 of the computer constructed in this manner, the bracket 32 is inserted into the enclosure that is cleared of the one side panel 16, and is then screwed to the inner surface of the other side panel 16. In this case, the flange 40 at the one end portion of the bracket 32 is screwed to the side panel 16 by the three fixing screws 41.

Figure 6:
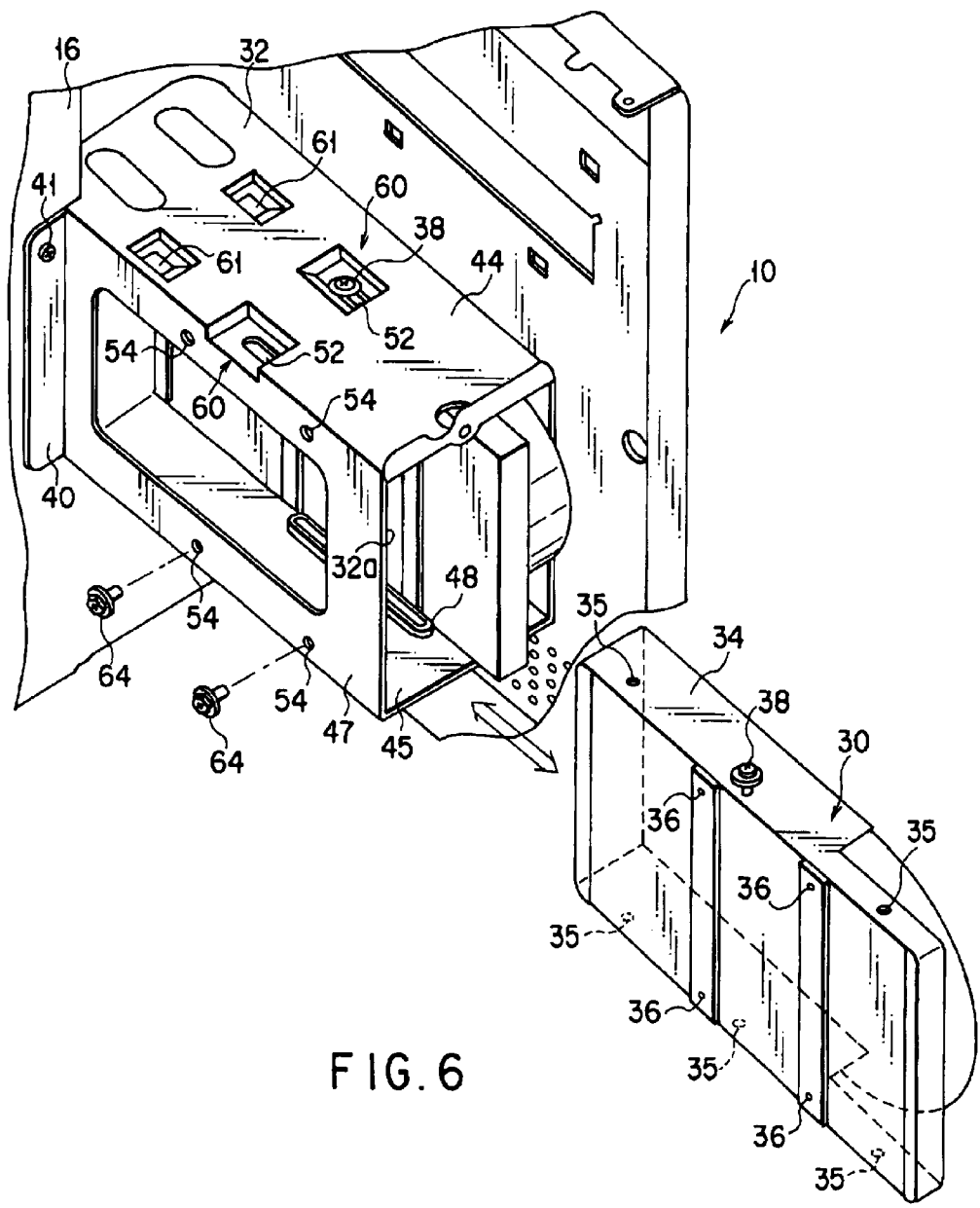
FIG. 6 is an exploded perspective view showing the bracket and the HDD.
Figure 7:
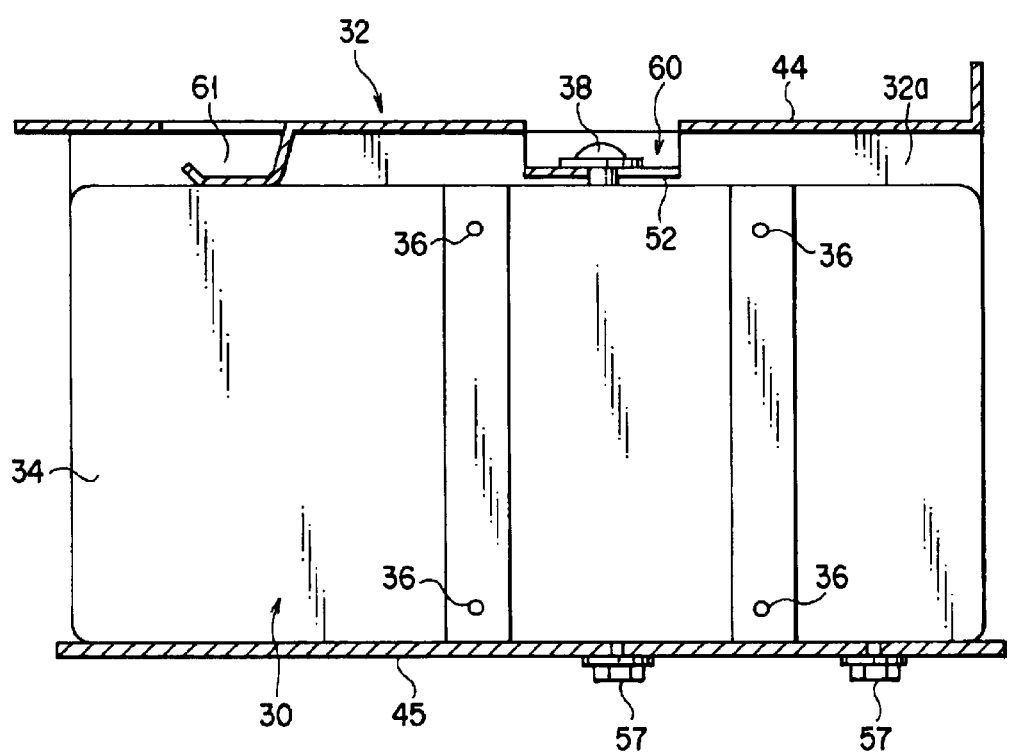
FIG. 7 is a cutaway side view showing the bracket loaded with the HDD.

As shown in FIGS. 6 and 7, thereafter, each HDD 30 is inserted into the bracket 32 through the loading slot 32a. As this is done, the HDD 30 is inserted in a manner such that the side face of the case 34 that is fitted with the collared screw 38 faces the inner surface of the top wall 44 of the bracket 32 and that the other side face of the case 34 faces the bottom wall 45 of the bracket 32. At the same time, the HDD 30 is guided along the guide ridge 48 into one of the inside regions of the bracket 32 on either side of the ridge 48.

When the HDD 30 is inserted into a position near the predetermined position in the bracket 32, the head of the collared screw 38 engages its corresponding engaging portion 60, whereupon the HDD 30 is held in the bracket. Specifically, as the HDD 30 is inserted into the bracket 32, a part of the collared screw 38 enters into the slit 52 of the engaging portion 60. At the same time, the collar of the screw 38 engages the upper surface of the engaging portion 60. As a side face of the distal end portion of the case 34 engages its corresponding positioning portion 61 of the bracket 32, moreover, the HDD 30 is automatically positioned in the predetermined position in the bracket.

After the HDD 30 is thus set in the predetermined position in the bracket 32, fixing screws 57 and the screwdriver are passed individually through the through holes 55 in the bottom panel 20 of the enclosure 10 from outside the enclosure. Further, the fixing screws 57 are driven individually into the tapped holes 35 in the side face of the HDD 30 through the apertures 50 in the bottom wall 45 of the bracket 32, as shown in FIGS. 7 and 8. Thereupon, the HDD 30 set in the predetermined position is fixedly screwed to the bracket 32.

Instead of utilizing the tapped holes 35 in the side face of the HDD 30, moreover, the HDD may be fixed in a manner such that fixing screws 64 are driven individually into the tapped holes 36 in the base of the HDD 30 through the apertures 54 in the rear wall 47 of the bracket 32, as shown in FIG. 6.

The bracket 32 is designed to be loaded with two HDDs 30. In additionally setting a second HDD after the computer is shipped, therefore, the HDD is fixed by means of the fixing screws 57 after it is inserted into the bracket 32, which is already attached to the enclosure 10, and set in the predetermined position in the same manner as aforesaid.

In removing the HDD 30 from the enclosure 10 for the purpose of replacement or maintenance, for example, on the other hand, aforementioned processes of operation are carried out reversely. More specifically, the screwdriver is passed through each of the through holes 55 in the bottom panel 20 of the enclosure 10 from outside the enclosure, and the fixing screws 57 are removed to unfix the HDD 30. Thereupon, the HDD 30 can be drawn out of the bracket 32.

According to the computer constructed in this manner, the HDD is attached to the bracket 32 in a manner such that one side of the HDD is held by means of the protuberance and only the other side is screwed. Therefore, the HDD 30 can be mounted in and removed from the enclosure 10 without removing the bracket 32 from the enclosure, so that HDDs can be mounted, replaced, or added with ease. Thus, the efficiency in assembly and disassembly of the computer body and recyclability can be improved. At the same time, an unskilled user can easily increase the number of HDDs installed.

Since the enclosure 10 is provided with the through holes 55 for screwdriver insertion that allow the screwing portion of the bracket 32 to be accessed from outside the enclosure, the efficiency in assembly and disassembly of the computer can be further improved.

Thus, there may be provided a memory fixing bracket that facilitates attachment and detachment of a memory and an electronic apparatus provided with the same.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

In the embodiment described, for example, the bracket is attached to a side panel in a manner such that it adjoins the front and bottom panels of the enclosure. Alternatively, however, the bracket may be attached to any other wall portion of the enclosure. Further, the through holes for screwdriver insertion in the enclosure may be formed in any wall portion other than the bottom panel, depending on the bracket mounting position. Furthermore, the memory is not limited to an HDD and may alternatively be a CD drive or any other storage device.

What is claimed is:

1. An electronic apparatus comprising:
    an enclosure having a plurality of wall portions;
    a bracket having a loading slot and removably mounted in the enclosure; and
    a module having a protuberance and a tapped hole and capable of being loaded into and unloaded from the bracket through the loading slot,
    the bracket having an engaging portion configured to engage the protuberance to hold the module in a predetermined position in the bracket, and an aperture located in a position opposite the tapped hole of the module which is held in the predetermined position, such that a screw is driven into the tapped hole through the aperture, the engaging portion including a raised portion formed by inwardly raising a part of the bracket and a slit formed in the raised portion, opening toward the loading slot of the bracket, and capable of being penetrated by a part of the protuberance.

2. An electronic apparatus according to claim 1, wherein the protuberance has a collared screw having a collar and screwed in the module.

3. An electronic apparatus according to claim 1, wherein the wall portions of the enclosure have through holes for screwdriver insertion aligned with the aperture of the bracket.

4. An electronic apparatus according to claim 1, wherein the module has another tapped hole and another aperture located in a position opposite the other tapped hole of the module which is held in the predetermined position in the bracket, such that a screw is driven into the another tapped hole through the another aperture.

5. An electronic apparatus according to claim 1, wherein the bracket has a flange in contact with an inner surface of one of the wall portions of the enclosure and screwed to the wall portion.

6. An electronic apparatus according to claim 1, wherein the bracket has a size capable of storing a plurality of the modules arranged side by side and includes a guide ridge configured to guide the modules to be loaded and unloaded and regulate respective set positions of the modules.

7. An electronic apparatus to claim 1, wherein the bracket includes a positioning portion located side by side with the engaging portion in the direction of insertion of the module and capable of engaging the module to position the module with respect to the bracket.

* * * * *

UNITED STATES PATENT AND TRADEMARK OFFICE
CERTIFICATE OF CORRECTION

PATENT NO. : 6,811,230 B2
DATED : November 2, 2004
INVENTOR(S) : Imamura

It is certified that error appears in the above-identified patent and that said Letters Patent is hereby corrected as shown below:

Column 6,
Line 35, change "apparatus to" to -- apparatus according to --.

Signed and Sealed this

Fifth Day of July, 2005

JON W. DUDAS
*Director of the United States Patent and Trademark Office*